United States Patent
Jha (10) Patent No.: US 12,321,744 B1
(45) Date of Patent: Jun. 3, 2025

(54) SYSTEMS AND METHODS FOR HARDWARE GATHER OPTIMIZATION

(71) Applicant: Advanced Micro Devices, Inc., Santa Clara, CA (US)

(72) Inventor: Ashish Jha, Cary, NC (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 44 days.

(21) Appl. No.: 18/342,019

(22) Filed: Jun. 27, 2023

(51) Int. Cl.
*G06F 9/30* (2018.01)
*G06F 9/345* (2018.01)

(52) U.S. Cl.
CPC ...... *G06F 9/30036* (2013.01); *G06F 9/30098* (2013.01); *G06F 9/3455* (2013.01)

(58) Field of Classification Search
CPC ............. G06F 9/30036; G06F 9/30098; G06F 9/3455; G06F 9/44; G06F 9/30
See application file for complete search history.

(56) References Cited

U.S. PATENT DOCUMENTS

| | | | | |
|---|---|---|---|---|
| 6,389,478 | B1* | 5/2002 | Blackmore | H04L 67/10 709/236 |
| 7,219,214 | B2* | 5/2007 | Ford | G06F 9/30109 712/E9.034 |
| 10,963,251 | B2* | 3/2021 | Grocutt | G06F 9/30036 |
| 11,036,502 | B2* | 6/2021 | Grocutt | G06F 9/30043 |
| 12,061,540 | B2* | 8/2024 | Goshima | G06F 12/0855 |
| 2017/0177355 | A1* | 6/2017 | Ould-Ahmed-Vall | G06F 9/30043 |
| 2023/0409324 | A1* | 12/2023 | Yoda | G06F 9/384 |

FOREIGN PATENT DOCUMENTS

| | | | | |
|---|---|---|---|---|
| GB | 2338094 B | * | 5/2003 | ........... G06F 7/5443 |
| WO | WO-2013048369 A1 | * | 4/2013 | ......... G06F 15/8061 |

* cited by examiner

*Primary Examiner* — Cheng Yuan Tseng
(74) *Attorney, Agent, or Firm* — Greenberg Traurig, LLP (57) ABSTRACT

A computer-implemented method for hardware gather optimization can include identifying, by at least one processor, one or more gather instructions that retrieve data from contiguous memory locations. The method can additionally include converting, by the at least one processor, the one or more gather instructions into one or more strided load instructions in response to the identification. The method can also include loading, by the at least one processor, data retrieved using the one or more strided load instructions into one or more vector registers. Various other methods, systems, and computer-readable media are also disclosed.

20 Claims, 4 Drawing Sheets

| | Internal YMM Register Lanes | | | | | Program/Assembly YMM Register Lanes | | | |
|---|---|---|---|---|---|---|---|---|---|
| YMM Registers | 3 | 2 | 1 | 0 | | | 3 | 2 | 1 | 0 |
| YMM_10000 | | &100010 | &100008 | &100000 | | | | | | |
| YMM_20000 | | &200010 | &200008 | &200000 | | | | | | |
| YMM_30000 | | &300010 | &300008 | &300000 | | | | | | |
| YMM_40000 | | &400010 | &400008 | &400000 | | | | | | |
| | | | | | | YMM Registers | 3 | 2 | 1 | 0 |
| | | | | | | YMM_x | &400000 | &300000 | &200000 | &100000 |
| | | | | | | YMM_y | &400008 | &300008 | &200008 | &100008 |
| | | | | | | YMM_z | &400010 | &300010 | &200010 | &100010 |

*FIG. 4*

SYSTEMS AND METHODS FOR HARDWARE GATHER OPTIMIZATION

BACKGROUND

Vector gather instructions aid in loading sparse (i.e., non-contiguous) memory elements. In contrast, vector load instructions are intended for accessing strided (i.e., contiguous) memory access. Gather instructions aid software and/or hardware, such as compilers, to auto-vectorize loops with sparse memory accesses, thereby assisting in delivery of significant performance improvements, especially in the area of high performance computing (HPC) and server class applications. Vectorization using compilers can be difficult. Hence, if memory addresses are ambiguous, a compiler can sometimes use gather instructions for strided/contiguous memory accesses.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example implementations described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for hardware gather optimization. For example, gather instructions are able to retrieve sparsely located data from memory, and thus are particularly useful to high performance computing applications (e.g., supercomputers, high performance compilers, artificial intelligence, etc.). However, many such applications utilize routines that frequently result in storage and retrieval of data to and from contiguous memory locations. Gather instructions are significantly less efficient than strided load instructions that can retrieve data stored in contiguous memory locations.

The disclosed systems and methods can identify one or more gather instructions that retrieve data from contiguous memory locations and convert those instructions to strided load instructions. For example, an individual gather instruction can be converted to a strided load instruction in response to identifying that its indices reference contiguous memory locations. The retrieved data can be loaded into a vector register in a manner that achieves a same result as if the gather instruction had been utilized to retrieve the data. Alternatively or additionally, multiple gather instructions can be micro-fused by converting them to multiple strided load instructions for indices of the multiple gather instructions. This conversion can be performed in response to identifying that the indices reference contiguous memory locations. The retrieved data can be loaded into corresponding indices of multiple vector registers (e.g., using swizzles and permutes) in a manner that achieves a same result as if the gather instruction had been utilized to retrieve the data.

The disclosed systems and methods can provide numerous benefits. For example, by identifying opportunities to convert gather instructions to strided load instructions and doing so, the disclosed systems and methods opportunistically reduce usage of expensive hardware resources, improve memory bandwidth, reduce memory traffic by reducing individual loads, reduce usage of buffers and queues (e.g., load and scheduling buffers) by a factor of four, and reduce power consumption.

In one example, a computing device can include contiguous address identification circuitry configured to identify one or more gather instructions that retrieve data from contiguous memory locations, gather instruction conversion circuitry configured to convert the one or more gather instructions into one or more strided load instructions in response to the identification, and vector load circuitry configured to load data retrieved using the one or more strided load instructions into one or more vector registers.

Another example can be the previously described example computing device, wherein the contiguous address identification circuitry is configured to identify that indices of an individual gather instruction reference the contiguous memory locations.

Another example can be any of the previously described example computing devices, wherein the gather instruction conversion circuitry is configured to convert the individual gather instruction into an individual strided load instruction in response to the recognition.

Another example can be any of the previously described example computing devices, wherein the vector load circuitry is configured to load the data into indices of an individual vector register.

Another example can be any of the previously described example computing devices, wherein the contiguous address identification circuitry is configured to identify that indices of multiple gather instructions reference the contiguous memory locations.

Another example can be any of the previously described example computing devices, wherein the gather instruction conversion circuitry is configured to micro-fuse, in response to the recognition, the multiple gather instructions into multiple strided load instructions for indices of the multiple gather instructions.

Another example can be any of the previously described example computing devices, wherein the vector load circuitry is configured to load the data into corresponding indices of multiple vector registers using at least one of swizzles or permutes.

In one example, a system can include at least one physical processor and physical memory that includes computer-executable instructions that, when executed by the at least one physical processor, cause the at least one physical processor to identify one or more gather instructions that retrieve data from contiguous memory locations, convert the one or more gather instructions into one or more strided load instructions in response to the identification, and load data retrieved using the one or more strided load instructions into one or more vector registers.

Another example can be the previously described example system, wherein the computer-executable instructions cause the at least one physical processor to identify that indices of an individual gather instruction reference the contiguous memory locations.

Another example can be any of the previously described example systems, wherein the computer-executable instructions cause the at least one physical processor to convert the individual gather instruction into an individual strided load instruction in response to the recognition.

Another example can be any of the previously described example systems, wherein the computer-executable instructions cause the at least one physical processor to load the data into indices of an individual vector register.

Another example can be any of the previously described example systems, wherein the computer-executable instructions cause the at least one physical processor to identify that indices of multiple gather instructions reference the contiguous memory locations.

Another example can be any of the previously described example systems, wherein the computer-executable instructions cause the at least one physical processor to micro-fuse, in response to the recognition, the multiple gather instructions into multiple strided load instructions for indices of the multiple gather instructions.

Another example can be any of the previously described example systems, wherein the computer-executable instructions cause the at least one physical processor to load the data into corresponding indices of multiple vector registers using at least one of swizzles or permutes.

In one example, a computer-implemented method can include identifying, by at least one processor, one or more gather instructions that retrieve data from contiguous memory locations, converting, by the at least one processor, the one or more gather instructions into one or more strided load instructions in response to the identification, and loading, by the at least one processor, data retrieved using the one or more strided load instructions into one or more vector registers.

Another example can be the previously described example method, wherein the identifying includes recognizing, by the at least one processor, that indices of an individual gather instruction reference the contiguous memory locations.

Another example can be any of the previously described example methods, wherein the converting includes converting, by the at least one processor, the individual gather instruction into an individual strided load instruction in response to the recognition.

Another example can be any of the previously described example methods, wherein the identifying includes recognizing, by the at least one processor, that indices of multiple gather instructions reference the contiguous memory locations.

Another example can be any of the previously described example methods, wherein the converting includes micro-fusing, by the at least one processor and in response to the recognition, the multiple gather instructions into multiple strided load instructions for indices of the multiple gather instructions.

Another example can be any of the previously described example methods, wherein the loading includes loading, by the at least one processor, the data into corresponding indices of multiple vector registers using at least one of swizzles or permutes.

Figure 1:
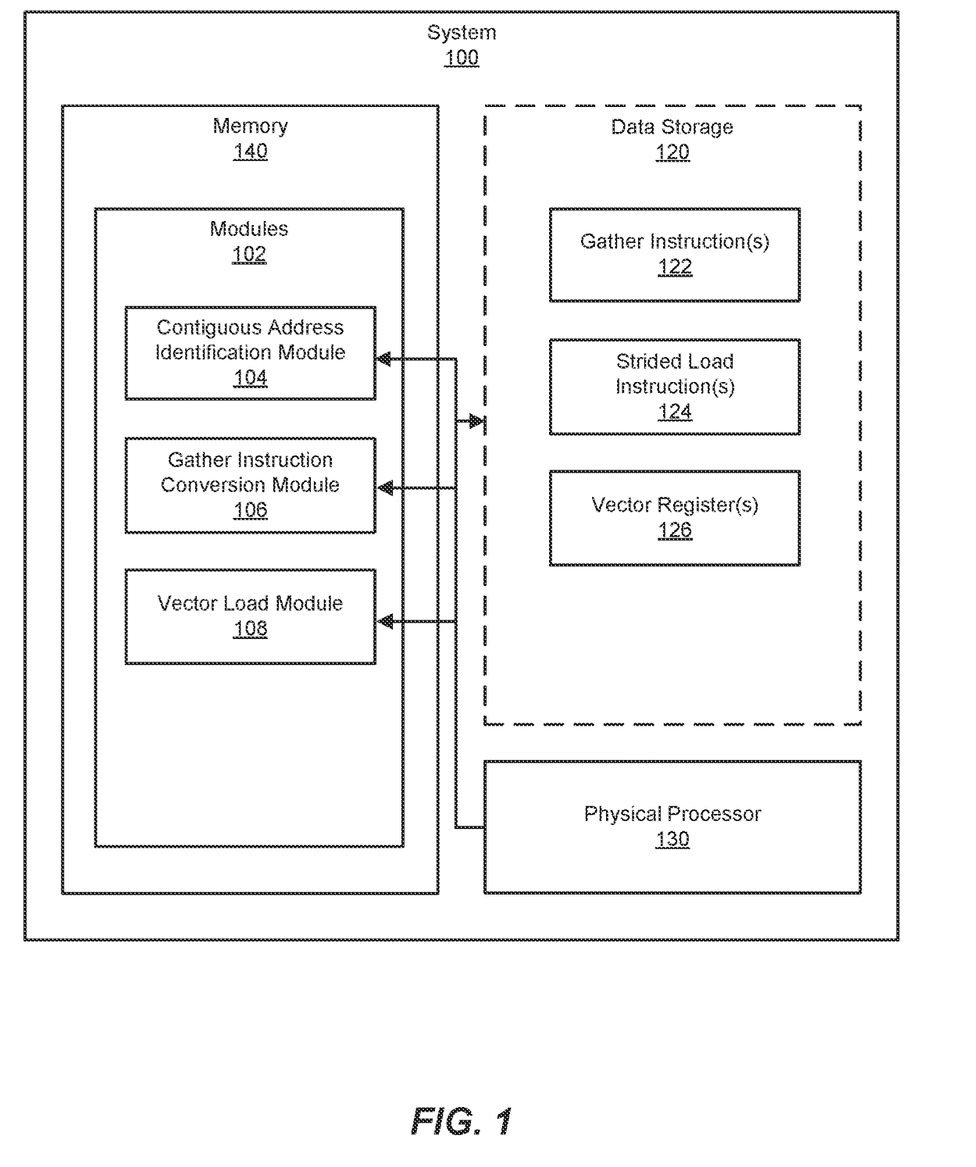
FIG. 1 is a block diagram of an example system for hardware gather optimization.
Figure 2:
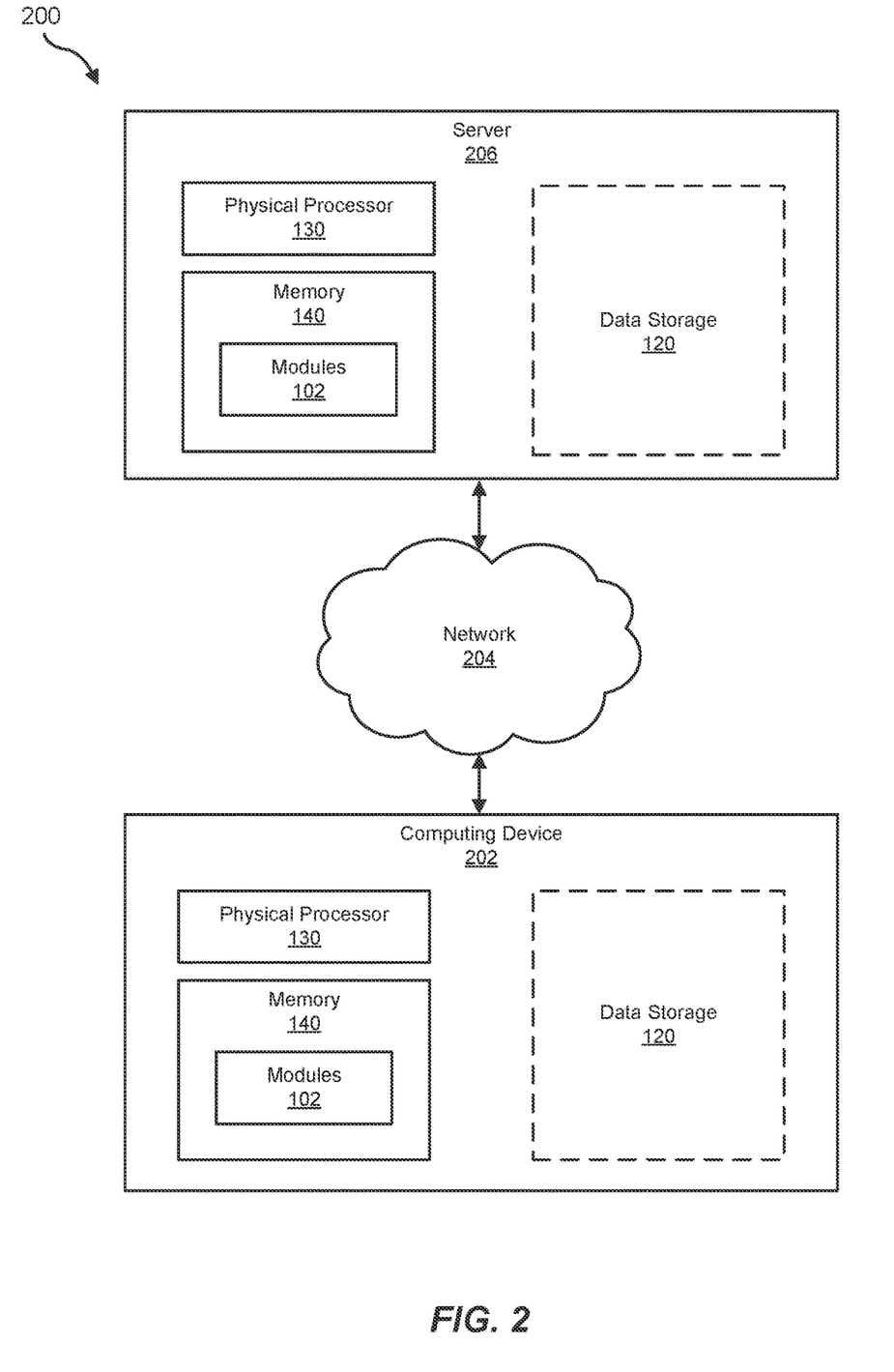
FIG. 2 is a block diagram of an additional example system for hardware gather optimization.

The following will provide, with reference to FIGS. 1-2, detailed descriptions of example systems for hardware gather optimization. Detailed descriptions of corresponding computer-implemented methods will also be provided in connection with FIG. 3. In addition, detailed descriptions of example accesses and writes to register lanes in accordance with an implementation of hardware gather optimization.

FIG. 1 is a block diagram of an example system 100 for hardware gather optimization. As illustrated in this figure, example system 100 can include one or more modules 102 for performing one or more tasks. As will be explained in greater detail below, modules 102 can include a contiguous address identification module 104, a gather instruction conversion module 106, and a vector load module 108. Although illustrated as separate elements, one or more of modules 102 in FIG. 1 can represent portions of a single module or application.

In certain implementations, one or more of modules 102 in FIG. 1 can represent one or more software applications or programs that, when executed by a computing device, can cause the computing device to perform one or more tasks. For example, and as will be described in greater detail below, one or more of modules 102 can represent modules stored and configured to run on one or more computing devices, such as the devices illustrated in FIG. 2 (e.g., computing device 202 and/or server 206). One or more of modules 102 in FIG. 1 can also represent all or portions of one or more special-purpose computers configured to perform one or more tasks.

The term "modules," as used herein, can generally refer to one or more functional components of a computing device. For example, and without limitation, a module or modules can correspond to hardware, software, or combinations thereof. In turn, hardware can correspond to analog circuitry, digital circuitry, communication media, or combinations thereof. In some implementations, the modules can be implemented as microcode (e.g., digital and/or analog circuitry) and/or one or more firmware in a graphics processing unit.

As illustrated in FIG. 1, example system 100 can also include one or more memory devices, such as memory 140. Memory 140 generally represents any type or form of volatile or non-volatile storage device or medium capable of storing data and/or computer-readable instructions. In one example, memory 140 can store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 can also include one or more physical processors, such as physical processor 130. Physical processor 130 generally represents any type or form of hardware-implemented processing unit capable of interpreting and/or executing computer-readable instructions. In one example, physical processor 130 can access and/or modify one or more of modules 102 stored in memory 140. Additionally or alternatively, physical processor 130 can execute one or more of modules 102 to facilitate hardware gather optimization. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 can also include one or more instances of stored data, such as data storage 120. Data storage 120 generally represents any type or form of stored data, however stored (e.g., signal line transmissions, capacitors, bit registers, flip flops, software in rewritable memory, configurable hardware states, combinations thereof, etc.). In one example, data storage 120 includes databases, spreadsheets, tables, lists, matrices, trees, or any other type of data structure. Examples of data storage 120 include, without limitation, gather instruction(s) 122, selected strided load instruction(s) 124, and vector register(s) 126.

Example system 100 in FIG. 1 can be implemented in a variety of ways. For example, all or a portion of example system 100 can represent portions of example system 200 in FIG. 2. As shown in FIG. 2, system 200 can include a computing device 202 in communication with a server 206 via a network 204. In one example, all or a portion of the functionality of modules 102 can be performed by computing device 202, server 206, and/or any other suitable computing system. As will be described in greater detail below, one or more of modules 102 from FIG. 1 can, when executed by at least one processor of computing device 202 and/or server 206, enable computing device 202 and/or server 206 to facilitate hardware gather optimization.

Computing device 202 generally represents any type or form of computing device capable of reading computer-executable instructions. In some implementations, computing device 202 can be and/or include one or more graphics processing units having a chiplet processor connected by a switch fabric. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that is capable of reading computer-executable instructions. In some implementations, computing device 202 can be and/or include a cloud service (e.g., cloud gaming server) that includes one or more graphics processing units having a chiplet processor connected by a switch fabric. Additional examples of server 206 include, without limitation, storage servers, database servers, application servers, and/or web servers configured to run certain software applications and/or provide various storage, database, and/or web services. Although illustrated as a single entity in FIG. 2, server 206 can include and/or represent a plurality of servers that work and/or operate in conjunction with one another.

Network 204 generally represents any medium or architecture capable of facilitating communication or data transfer. In one example, network 204 can facilitate communication between computing device 202 and server 206. In this example, network 204 can facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems can be connected to system 100 in FIG. 1 and/or system 200 in FIG. 2. Conversely, all of the components and devices illustrated in FIGS. 1 and 2 need not be present to practice the implementations described and/or illustrated herein. The devices and subsystems referenced above can also be interconnected in different ways from that shown in FIG. 2. Systems 100 and 200 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
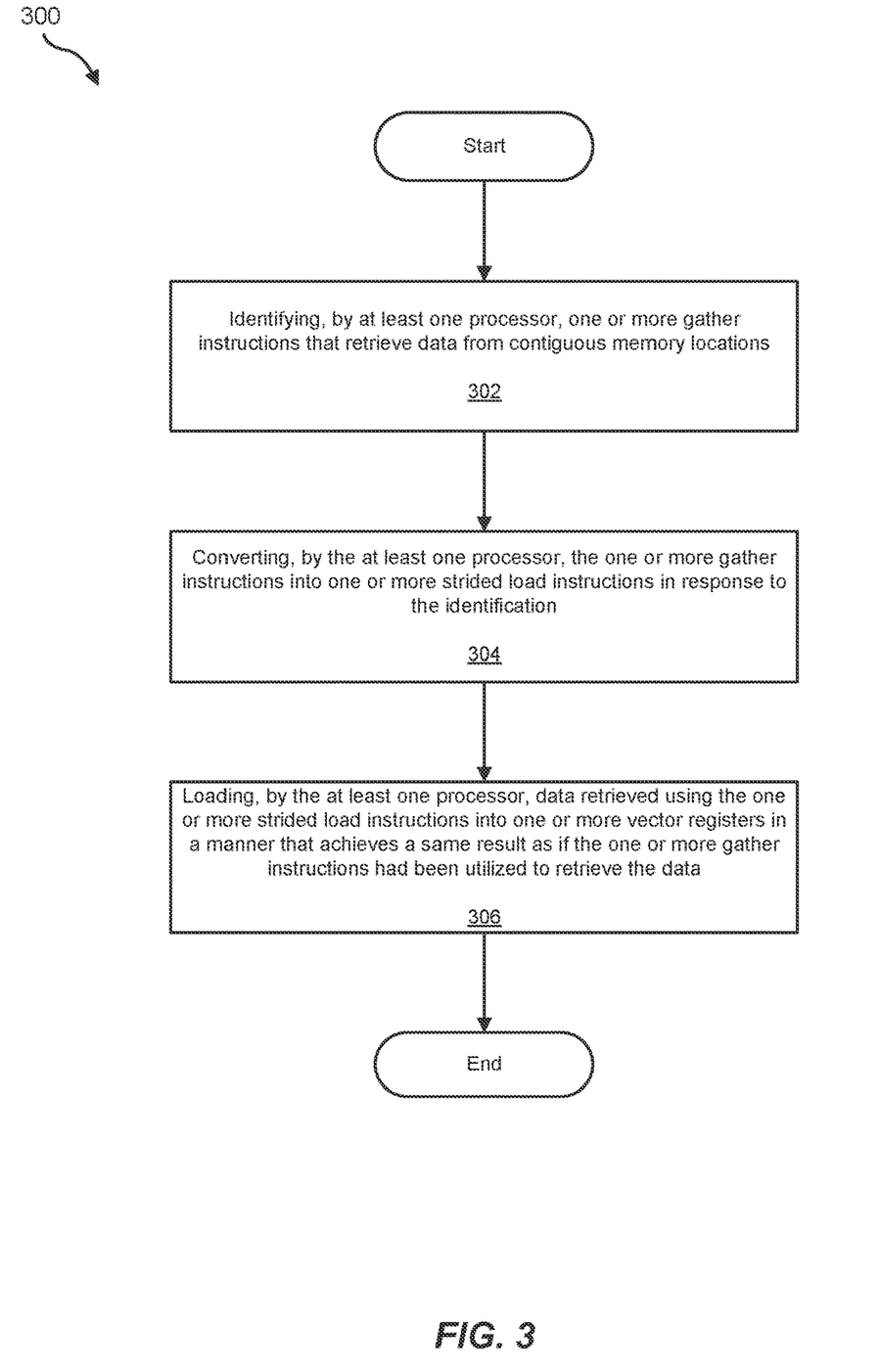
FIG. 3 is a flow diagram of an example method for hardware gather optimization.

FIG. 3 is a flow diagram of an example computer-implemented method 300 for hardware gather optimization. The steps shown in FIG. 3 can be performed by any suitable computer-executable code and/or computing system, including system 100 in FIG. 1, system 200 in FIG. 2, and/or variations or combinations of one or more of the same. In one example, each of the steps shown in FIG. 3 can represent an algorithm whose structure includes and/or is represented by multiple sub-steps, examples of which will be provided in greater detail below.

The term "computer-implemented method," as used herein, can generally refer to a method performed by hardware or a combination of hardware and software. For example, hardware can correspond to analog circuitry, digital circuitry, communication media, or combinations thereof. In some implementations, hardware can correspond to digital and/or analog circuitry arranged to carry out one or more portions of the computer-implemented method. In some implementations, hardware can correspond to physical processor 130 of FIG. 1. Additionally, software can correspond to software applications or programs that, when executed by the hardware, can cause the hardware to perform one or more tasks that carry out one or more portions of the computer-implemented method. In some implementations, software can correspond to one or more of modules 102 stored in memory 140 of FIG. 1.

As illustrated in FIG. 3, at step 302 one or more of the systems described herein can identify contiguous memory locations. For example, contiguous address identification module 104 can, as part of computing device 202 in FIG. 2, identify, by at least one processor, one or more gather instructions that retrieve data from contiguous memory locations.

The term "contiguous memory locations," as used herein, can generally refer to memory locations that are sequential in a sequence of the memory locations in a memory. For example, and without limitation, sequential memory locations can be a sequence of bits, a sequence of bytes, etc.

The term "gather instructions," as used herein, can generally refer to instructions employed to collect data from memory in a gather/scatter type of memory addressing. For example, and without limitation, gather instructions can be used to collect data from multiple, arbitrary indices. Examples of its use include sparse linear algebra operations, sorting algorithms, fast Fourier transforms, and some computational graph theory problems. It is the vector equivalent of register indirect addressing, with gather involving indexed reads. Vector processors, and some single instruction multiple data (SIMD) units in CPUs, can have hardware support for gather operations.

The systems described herein can perform step 302 in a variety of ways. In one example, contiguous address identification module 104 can, as part of computing device 202 in FIG. 2, recognize, by the at least one processor, that indices of an individual gather instruction reference the contiguous memory locations. Alternatively or additionally, contiguous address identification module 104 can, as part of computing device 202 in FIG. 2, recognize, by the at least one processor, that indices of multiple gather instructions reference the contiguous memory locations.

At step 304, one or more of the systems described herein can convert one or more gather instructions. For example, gather instruction conversion module 106 can, as part of computing device 202 in FIG. 2, convert, by the at least one processor, the one or more gather instructions into one or more strided load instructions in response to the identification.

The term "strided load instructions," as used herein, can generally refer to instructions that collect data from memory using a memory access pattern of accessed memory fields that are equally distant. For example, structured loads/stores, such as VLDn/VSTn in ARM NEON, are one type of strided SIMD data access instructions.

The term "convert," as used herein, can generally refer to replacing a gather instruction with a strided load instruction using an address and/or index of the gather instruction. For example, and without limitation, a gather instruction can include a base address and an index register, and a strided load instruction can use a move command (e.g., vmovdqu) that moves values from an integer vector to an unaligned memory location. For an individual gather instruction that seeks to gather data from contiguous memory locations, the individual gather instruction can be replaced with an individual strided load instruction using the base address of the individual gather instruction. For multiple gather instructions that do not individually seek to gather data from contiguous memory locations but that collectively contain indices that reference contiguous memory locations (e.g., have base addresses that reference contiguous memory locations and index registers that are offset in an identical manner), the multiple gather instructions can be micro-fused. Micro-fusing the multiple gather instructions can replace them with multiple strided load instructions that use effective addresses computed across the various gather instructions as they are allocated in a reorder buffer (ROB). For example, the address of one strided load instruction can be the base address of a particular gather instruction that seeks to gather data that precedes data of the other gather instructions in the ROB, and the other strided load instructions can use effective addresses that are offset from that base address according to the indices of the particular gather instruction.

The systems described herein can perform step 304 in a variety of ways. In one example, gather instruction conversion module 106 can, as part of computing device 202 in FIG. 2, convert, by the at least one processor, the individual gather instruction into an individual strided load instruction in response to the recognition. Alternatively or additionally, gather instruction conversion module 106 can, as part of computing device 202 in FIG. 2, micro-fuse, by the at least one processor and in response to the recognition, the multiple gather instructions into multiple strided load instructions for indices of the multiple gather instructions.

At step 306, one or more of the systems described herein can load data. For example, vector load module 106 can, as part of computing device 202 in FIG. 2, load, by the at least one processor, data retrieved using the one or more strided load instructions into one or more vector registers.

The term "vector registers," as used herein, can generally refer to registers that store one dimensional arrays of data. For example, and without limitation, vector registers can hold data for vector processing performed using SIMD instructions.

The systems described herein can perform step 306 in a variety of ways. In one example, vector load module 106 can, as part of computing device 202 in FIG. 2, load the data into the one or more vector registers in a manner that achieves a same result as if the one or more gather instructions had been utilized to retrieve the data. In some implementations, vector load module 106 can, as part of computing device 202 in FIG. 2, load the data into indices of an individual vector register. Alternatively or additionally, vector load module 106 can, as part of computing device 202 in FIG. 2, load, by the at least one processor, the data into corresponding indices of multiple vector registers using at least one of swizzles or permutes.

Sparse memory can be significantly separated, for example, when randomly accessing elements of a billion element array. In such a case, little can be done to achieve improvement. However, as is often the case in HPC, the array elements can be structures (e.g., struct in C, containing few elements, etc.) and the loop loads can be elements of a "strided" data structure. Thus, accessing individual elements of Struct in an array can be sparse but, when combined with other elements of a structure, there can be spatial locality that can be harnessed in accordance with the disclosed systems and methods. Some computer instruction set architectures, such as x86, have notoriously poor gather and scatter performance. The disclosed systems and methods can improve performance and power across a wide spectrum of applications without software/compiler intervention.

The disclosed systems and methods can auto-identify, in hardware, if the memory is contiguous and, if so, promote the gather instructions to strided load instruction. In some examples, the disclosed systems and methods can identify if there are other gather instructions issued in part of the same memory address space and, in that case, micro-fuse these gather instructions into strided load instructions and internally load elements in corresponding vector registers as expected. These procedures can greatly benefit HPC applications, high performance compilers, and low-level assembly language programmers on x86 and across other computer instruction set architectures, such as instruction set architecture (ISA) and/or ARM (e.g., formerly an acronym for Advanced RISC Machines and originally Acorn RISC Machine).

The disclosed systems and methods address several issues. For example, the disclosed systems and methods can identify if a gather-scatter instruction is using strided contiguous memory and, in that case, promote the gather/scatter instruction to a strided load/store instruction. Currently, if one uses gather instructions to load contiguous memory, the procedure is slower by 4x-16x depending on ISA (AVX2, AVX512) and data-type (e.g., 32-bit and/or 64-bit integers or floating point). In this context, the disclosed systems and methods can allow a compiler to vectorize the loop using simple gather and scatter instructions where memory accesses cannot be disambiguated. Thus, by not using gather and scatter, the loop cannot be vectorized, leaving significant performance on the table. Additionally, the disclosed systems and methods can allow a compiler to vectorize a loop with an array of structured data, and each iteration can load all elements of the structure in a given array position. In this context, a compiler cannot disambiguate that individual elements of a structure have spatial locality for a given iteration and rightfully generate a gather instruction. However, there is opportunity to optimize for performance in hardware.

For example, consider the following loop:
Struct Atom {double x, double y, double z}; //Atom Structure with 3 elements
Atom AtomArray[1Million]; //An array of Atom elements
For (i=0; i<1 Million; i++){
    Int atom_i=space [i]; //Atom's spread in space. Here, atom_i can be any random value such as 1000, 10000, 20000, etc. and hence it is parse.
    Double x=AtomArray[atom_i].x;
    Double y=AtomArray[atom_i].y;
    Double z=AtomArray[atom_i].z;
    Double force=x*x+y*y+z*z
    //do some compute with force, etc.
}

Assuming the above loop is vectorized with AVX2 ISA with each register being 256-bit and a data set being a 64-bit (double), it can hold four such double elements. Thus, for this vectorized loop (e.g., for 4 "i" iterations), there can be three gather instructions, one each for loading x, y, and z elements as demonstrated with the following pseudo code:
    YMM_x=Gather of 4 x's
    YMM_y=Gather of 4 y's
    YMM_z=Gather of 4 z's For YMM_x, the internal hardware gather engine can require four load buffers and fire off four loads. The same can be true for y and z's, with a total of twelve load buffers and twelve individual loads from memory.

As described in the following example implementation, the disclosed systems and methods can speed up this process in hardware by taking advantage of spatial locality of x, y, and z indices of a given atom, providing not only significant speed up but also consuming lower power by using less hardware buffers, such as load and store buffers, etc. Compared to current implementations, the proposed implementation can not only be performance efficient but also power efficient by utilizing less hardware resources, such as load and store buffers and queues. These benefits can be applicable for a wide a variety of HPC and server class applications.

At a microarchitecture level, the disclosed systems and methods can dissect a single gather instruction to determine whether it can be promoted to a strided load instruction. The disclosed systems and methods can additionally or alternatively analyze a set of gathers stream to identify if arrays of structures are loaded (e.g., gather micro-fusion), convert the set of gathers from the stream into a set of strided load instructions, and use swizzles and/or permutes to load individual structure elements into the vector array as dictated by the assembly instruction.

In a first case in which a gather instruction is simply loading sparse memory, the gather instruction can include a base register that contains a base memory address and an index register that contains the indices to be loaded. Consider the following example code:
    Double d_array[1000000]; //an array of 1 Million elements.

A gather instruction to load elements 1, 1000, 10000, and 100000 represents a truly sparse case. An example gather instruction of this case can have a base address of &d_array[0] and an index register that contains values 1, 1000, 10000, and 100000. These values can be loaded into a vector register YMM by the gather instruction.

In some implementations, the disclosed systems and methods can take the base address and indices, compute an effective address, and identify whether the indices are contiguous. If the indices are contiguous, then the gather instruction can be converted into a strided load instruction. For this first case, however, the indices are not contiguous, so the gather instruction is not converted into a strided load instruction.

In a second case, a gather instruction can involve loading a strided/contiguous memory. Again, considering the array of one million elements presented above in the first case, a gather instruction to load elements 1, 2, 3 and 4 represents an access and load situation in which a strided load instruction would be appropriate, but the compiler generated a gather instruction. In this second case, an example AVX2 gather instruction can have a base address of &d_array[0] and an index register containing values 1, 2, 3, 4. These values will normally be loaded into a vector register YMM by the Gather instruction.

In some implementations, the disclosed systems and methods can take the base address and indices, compute an effective address, and identify whether the indices are contiguous. If the indices are contiguous, then the gather instruction can be converted into a strided load instruction. For this second case, the indices are contiguous, so the gather instruction is converted into a strided load instruction such as vmovdqu ymm1, &d_array[0]. A final loaded value in the YMM register can be as expected by the generated assembly code. In this second case, speed of the memory access and loading operation can be improved by an approximate factor of four because the strided load instruction does not have to go through the gather state machine. Additionally, the strided load instruction avoids wasting hardware buffers and queues while improving power efficiency.

In a third case, a set of gather instructions can individually load a sparse array of structures. Consider the following example code:
Struct Atom {double x, double y, double z}; //Atom Structure with 3 elements//note spatial locality of these elements of the atoms (i.e., elements x, y, and z are contiguous in memory)//this spatial locality can be leveraged, even though individual structures loaded could be sparse.
Atom AtomArray[1Million]; //An array of Atom elements
For (i=0; i<1 Million; i++){
    Int atom_i=space [i]; //Atom's spread in space (i.e., sparse). Here, atom_i can be any random value such as 10000, 20000, 30000 and 40000. Hence it is sparse.
    Double x=AtomArray[atom_i].x;
    Double y=AtomArray[atom_i].y;
    Double z=AtomArray[atom_i].z;
    Double force=x*x+y*y+z*z
    //perform compute with force, etc.
}

Assuming this loop to be vectorized with AVX2 ISA, and with each register being 256-bit and data set being 64-bit (e.g., double), it can hold four such double elements. Thus, for this vectorized loop (e.g., for 4 "i" iterations), there can be three gather instructions, including one each for loading x, y, and z elements. These three gather instructions can be represented by the following pseudo code:

YMM_x=Gather of 4 x's;
YMM_y=Gather of 4 y's;
YMM_z=Gather of 4 z's.

For YMM_x, the internal hardware gather engine can require four load buffers and fire off four loads, and the same can be true for each y gather instruction and z gather instruction. In a best case, the three gather instructions can use approximately twelve buffers to fire off twelve individual loads.

In some implementations, the disclosed systems and methods can take the base address and indices and compute the effective address across various gather instructions as they are allocated in a reorder buffer (ROB). For a given vector lane, a determination can be made whether the addresses are strided (i.e., next to each other). In a simple example, consider lane zero of a vector register. For that lane, the gather instructions can be loading atom_i, located at address 10000, and respectively loading its x, y, and z elements into lane zero of YMM register x, y, and z indices. A determination can be made that, in lane zero, an address for x is 10000, an address for y is 10008, and an address for z is 10010 (i.e., they are all next to each other (e.g., in hexadecimal notation)). A similar determination can find the same is true for lanes one, two, and three. In this example, the three gather instructions can be converted into four strided load instructions with the fourth lane being masked off. These strided load instructions can be represented by the following example code:

YMM_10000=vmovdqu &10000//load struct elements x,y, and z starting at address 10000;
YMM_20000=vmovdqu &20000//load struct elements x,y, and z starting at address 20000;
YMM_30000=vmovdqu &30000//load struct elements x,y, and z starting at address 30000;
YMM_40000=vmovdqu &40000//load struct elements x,y, and z starting at address 40000.

Figure 4:
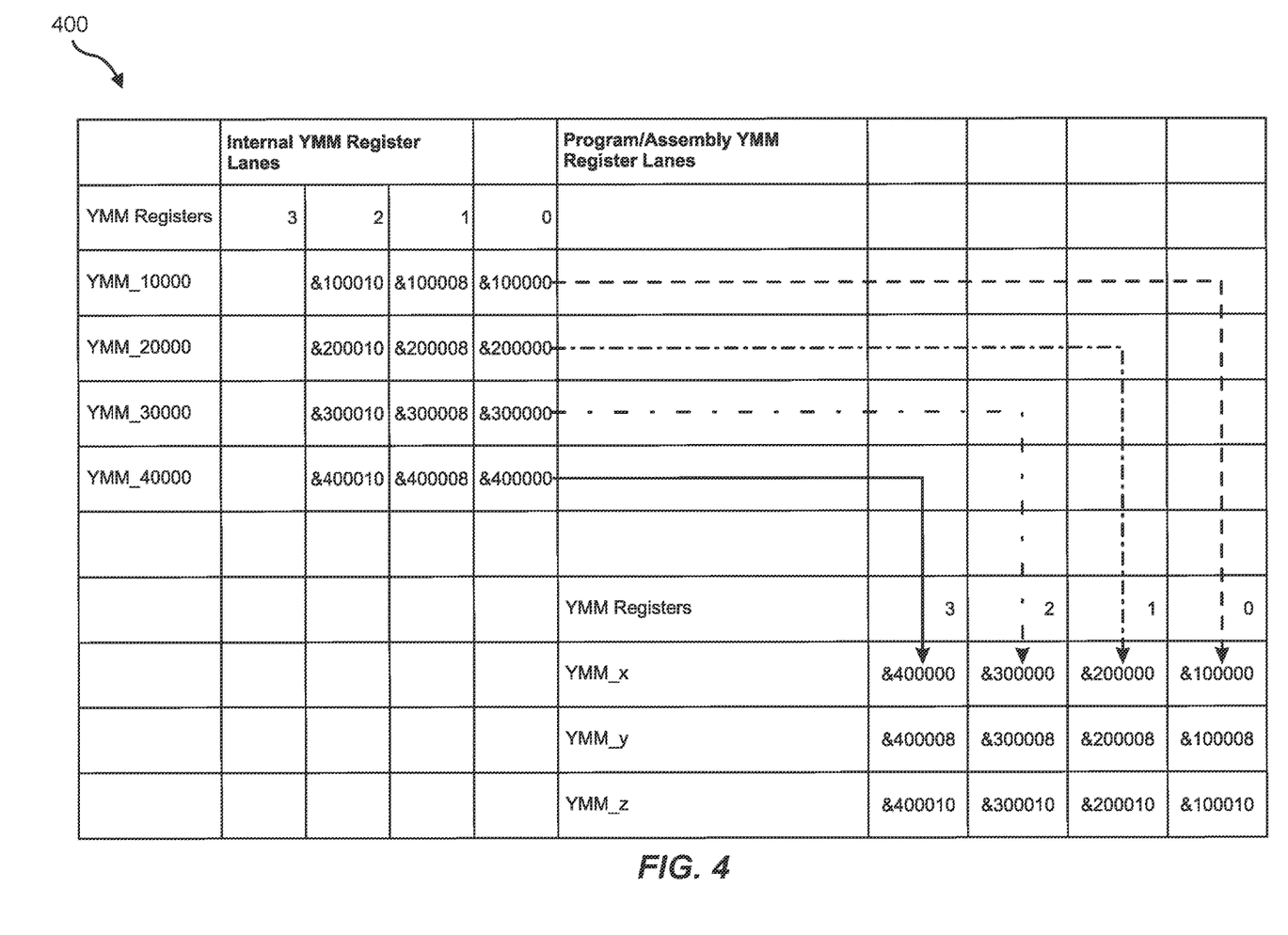
FIG. 4 is a graphical illustration of example accesses and writes to register lanes in accordance with an implementation of hardware gather optimization.

Structurally, the above procedure is illustrated in in FIG. 4 with example accesses and writes to register lanes 400. In FIG. 4, arrows show gathers converted to individual loads on a left side of FIG. 4 and accumulation of those values in vector registers YMM_x, YMM_y, and YMM_z on a right side of FIG. 4. For example, the conversion can take all x indices in lane zero and load them into the intended register YMM_x in a manner expected by the compiler that issued the gather instructions. The conversion can perform the same or similar procedure for data accumulated into lane one, lane two, and lane three. Thus, in this third case, there can be four load buffers utilized for four loads instead of twelve load buffers for twelve loads. Benefits here include a three times reduction in consumption of internal resources and a three times faster execution. This intelligence of gather micro-fusion can also be built into OpCache, which effectively caches opcodes of a given hot loop.

As set forth above, the disclosed systems and methods can identify one or more gather instructions that retrieve data from contiguous memory locations and convert those instructions to strided load instructions. For example, an individual gather instruction can be converted to a strided load instruction in response to identifying that its indices reference contiguous memory locations. The retrieved data can be loaded into a vector register in a manner that achieves a same result as if the gather instruction had been utilized to retrieve the data. Alternatively or additionally, multiple gather instructions can be micro-fused by converting them to multiple strided load instructions for indices of the multiple gather instructions. This conversion can be performed in response to identifying that the indices reference contiguous memory locations. The retrieved data can be loaded into corresponding indices of multiple vector registers (e.g., using swizzles and permutes) in a manner that achieves a same result as if the gather instruction had been utilized to retrieve the data.

The disclosed systems and methods can provide numerous benefits. For example, by identifying opportunities to convert gather instructions to strided load instructions and doing so, the disclosed systems and methods opportunistically reduce usage of expensive hardware resources, improve memory bandwidth, reduce memory traffic by reducing individual loads, reduce usage of buffers and queues (e.g., load and scheduling buffers) by a factor of four, and reduce power consumption.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 100 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of example system 100 in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device, comprising:
    circuitry configured to:
        in response to one or more gather instructions being identified that would retrieve data from contiguous memory locations, each gather instruction of the one or more gather instructions being a type of instruction that is able to cause data retrieval from non-contiguous memory locations,
        convert the one or more gather instructions into one or more strided load instructions that access the contiguous memory locations; and
        trigger data retrieval from the contiguous memory locations using the one or more strided load instructions.

2. The computing device of claim 1, wherein the circuitry is configured to identify the one or more gather instructions as retrieving data from contiguous memory locations at least in part by identifying that indices of an individual gather instruction reference locations that are contiguous in memory.

3. The computing device of claim 2, wherein the circuitry is configured to convert the one or more gather instructions into the one or more strided load instructions at least in part by converting the individual gather instruction into an individual strided load instruction in response to the identifying.

4. The computing device of claim 3, wherein the circuitry is further configured to load the retrieved data into indices of an individual vector register.

5. The computing device of claim 1, wherein the circuitry is configured to identify the one or more gather instructions as retrieving data from contiguous memory locations at least in part by identifying that indices of multiple gather instructions reference locations that are contiguous in memory.

6. The computing device of claim 5, wherein the circuitry is configured to convert the one or more gather instructions into the one or more strided load instructions at least in part by converting, in response to the identifying, the multiple gather instructions into multiple strided load instructions for indices of the multiple gather instructions.

7. The computing device of claim 5, wherein the circuitry is configured to load the retrieved data into corresponding indices of multiple vector registers using at least one of swizzles or permutes.

8. A system comprising:
    at least one physical processor; and
    physical memory comprising computer-executable instructions that, when executed by the at least one physical processor, cause the at least one physical processor to:
        in response to one or more gather instructions being identified that would retrieve data from contiguous memory locations, each gather instruction of the one or more gather instructions being a type of instruction that is able to cause data retrieval from non-contiguous memory locations,
        convert the one or more gather instructions into one or more strided load instructions that access the contiguous memory locations; and
        trigger data retrieval from the contiguous memory locations using the one or more strided load instructions.

9. The system of claim 8, wherein the computer-executable instructions cause the at least one physical processor to identify the one or more gather instructions as retrieving data from contiguous memory locations at least in part by identifying that indices of an individual gather instruction reference locations that are contiguous in memory.

10. The system of claim 9, wherein the computer-executable instructions cause the at least one physical processor to convert the one or more gather instructions into the one or more strided load instructions at least in part by converting the individual gather instruction into an individual strided load instruction in response to the identifying.

11. The system of claim 10, wherein the computer-executable instructions cause the at least one physical processor to load the retrieved data into indices of an individual vector register.

12. The system of claim 8, wherein the computer-executable instructions cause the at least one physical processor to identify the one or more gather instructions as retrieving data from contiguous memory locations at least in part by identifying that indices of multiple gather instructions reference locations that are contiguous in memory.

13. The system of claim 12, wherein the computer-executable instructions cause the at least one physical processor to convert the one or more gather instructions into the one or more strided load instructions at least in part by converting, in response to the identifying, the multiple gather instructions into multiple strided load instructions for indices of the multiple gather instructions.

14. The system of claim 13, wherein the computer-executable instructions cause the at least one physical processor to load the retrieved data into corresponding indices of multiple vector registers using at least one of swizzles or permutes.

15. A computer-implemented method comprising:
in response to, by at least one processor, one or more gather instructions being identified that would retrieve data from contiguous memory locations, each gather instruction of the one or more gather instructions being a type of instruction that is able to cause data retrieval from non-contiguous memory locations;
converting, by the at least one processor, the one or more gather instructions into one or more strided load instructions that access the contiguous memory locations; and
triggering, by the at least one processor, data retrieval from the contiguous memory locations using the one or more strided load instructions.

16. The computer-implemented method of claim 15, wherein the identifying includes identifying the one or more gather instructions as retrieving data from contiguous memory locations at least in part by identifying, by the at least one processor, that indices of an individual gather instruction reference locations that are contiguous in memory.

17. The computer-implemented method of claim 16, wherein the converting includes converting, by the at least one processor, the one or more gather instructions into the one or more strided load instructions at least in part by converting the individual gather instruction into an individual strided load instruction in response to the identifying.

18. The computer-implemented method of claim 15, wherein the identifying includes identifying, by the at least one processor, that indices of multiple gather instructions reference locations that are contiguous in memory.

19. The computer-implemented method of claim 18, wherein the converting includes converting the one or more gather instructions into the one or more strided load instructions at least in part by converting, by the at least one processor and in response to the identifying, the multiple gather instructions into multiple strided load instructions for indices of the multiple gather instructions.

20. The computer-implemented method of claim 19, wherein the loading includes loading, by the at least one processor, the retrieved data into corresponding indices of multiple vector registers using at least one of swizzles or permutes.

* * * * *